United States Patent
Rai et al.

(10) Patent No.: US 9,319,988 B1
(45) Date of Patent: Apr. 19, 2016

(54) METHOD AND SYSTEM FOR DETERMINING INITIAL TRANSMISSION POWER

(71) Applicant: Sprint Spectrum L.P., Overland Park, KS (US)

(72) Inventors: Deveshkumar N. Rai, Overland Park, KS (US); Saravana Velusamy, Olathe, KS (US); Rajil Malhotra, Olathe, KS (US); Srini Penugonda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 15 days.

(21) Appl. No.: 14/209,591

(22) Filed: Apr. 11, 2014

(51) Int. Cl.
| | |
|---|---|
| H04W 72/00 | (2009.01) |
| H01Q 11/12 | (2006.01) |
| H04B 1/04 | (2006.01) |
| H04B 7/00 | (2006.01) |
| H04W 52/04 | (2009.01) |

(52) U.S. Cl.
CPC .................................... *H04W 52/04* (2013.01)

(58) Field of Classification Search
CPC .............. H04W 52/00; H04W 52/04–52/18; H04W 52/22–52/223; H04W 52/226; H04W 52/228; H04W 52/246–52/248; H04W 52/283; H04W 52/38–52/40
USPC ........................................ 455/127.1, 450, 522
See application file for complete search history.

(56) References Cited

U.S. PATENT DOCUMENTS

| | | | |
|---|---|---|---|
| 8,391,859 B1 | 3/2013 | Pulugurta | |
| 8,526,990 B1* | 9/2013 | Pulugurta | 455/522 |
| 2008/0002646 A1* | 1/2008 | Hannu et al. | 370/338 |
| 2008/0254820 A1* | 10/2008 | Alpert | H04W 52/40 455/522 |
| 2009/0088083 A1* | 4/2009 | Fujii et al. | 455/69 |
| 2010/0062813 A1* | 3/2010 | Kujanski et al. | 455/571 |
| 2010/0167660 A1* | 7/2010 | Asanuma | 455/67.13 |
| 2012/0115535 A1* | 5/2012 | Jeong et al. | 455/522 |
| 2012/0135777 A1* | 5/2012 | Karpoor et al. | 455/522 |
| 2012/0252453 A1* | 10/2012 | Nagaraja et al. | 455/436 |
| 2012/0329503 A1* | 12/2012 | Jongren et al. | 455/509 |
| 2013/0077502 A1* | 3/2013 | Gainey et al. | 370/252 |
| 2013/0142113 A1* | 6/2013 | Fong et al. | 370/328 |
| 2013/0157651 A1* | 6/2013 | Khaitan et al. | 455/422.1 |
| 2013/0343288 A1* | 12/2013 | Ratasuk et al. | 370/329 |

* cited by examiner

*Primary Examiner* — Rafael Pérez-Gutiérrez
*Assistant Examiner* — Mark G. Pannell

(57) ABSTRACT

A method and corresponding system to help manage user equipment device (UE) transmission power, specifically in a scenario where the UE was being served by a base station on a first carrier frequency and the UE is then going to communicate with a base station (whether the same or another base station) instead on a second, different carrier frequency. As disclosed, a UE may determine, based on communication by the UE on the first carrier frequency, a baseline initial transmit power for the UE to use for an initial transmission from the UE to a cellular base station on the second carrier frequency. Responsive to the second carrier frequency being different than the first carrier frequency, the UE may adjust the baseline initial transmit power to establish an adjusted initial transmit power. The UE may then engage in the initial transmission using the adjusted baseline initial transmit power.

16 Claims, 5 Drawing Sheets

US 9,319,988 B1

METHOD AND SYSTEM FOR DETERMINING INITIAL TRANSMISSION POWER

BACKGROUND

Unless otherwise indicated herein, the materials described in this section are not prior art to the claims and are not admitted to be prior art by inclusion in this section.

To provide cellular wireless communication service, a wireless service provider typically operates a radio access network (RAN) that includes a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

In general, a RAN may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and UEs. These channels may be defined in various ways, such as through frequency division multiplexing, time division multiplexing, and/or code-division multiplexing, for instance. By way of example, each coverage area may define a pilot channel, reference channel, or other resource on which the base station may broadcast a pilot signal, reference signal, or the like that UEs may detect as an indication of coverage and may measure to evaluate coverage strength. As another example, each coverage area may define one or more uplink control channels or other resources on which UEs may transmit control messages to the base station. And each coverage area may define one or more downlink control channels or other resources on which the base station may transmit control messages or other information to UEs. Further, each coverage area may define one or more traffic channels or other resources for carrying bearer communication traffic such as (e.g., user traffic or application level traffic) as voice data and other data between the base station and UEs.

When a UE first powers on or enters into coverage of the RAN, the UE may scan the pilot or reference signals of the RAN's coverage areas in an effort to identify a strongest coverage area. The UE may then register with the RAN in that coverage area by transmitting a registration request, attach request, or the like to the base station serving that coverage area, and perhaps engaging in further registration signaling with the base station.

Once the UE is registered in the coverage area, the UE may then operate in an idle mode or a connected mode. In the idle mode, the UE may not have any assigned traffic channel resources on which to engage in bearer communication with the base station. However, if the UE seeks to establish bearer communication (at the UE's initiation, or in response to a page message from the base station for instance), the UE may transmit an access or connection request on an uplink access channel to the base station, to request assignment of traffic channel resources. And upon receipt of that request, the base station may then assign a traffic channel or other radio link resources to the UE, thereby transitioning the UE to the connected mode, so that the UE and base station can exchange bearer communications with each other.

When a UE communicates with a base station, the UE and base station may engage in a power control process to help manage the transmission power that the UE uses for transmission to the base station. In particular, as the UE transmits to the base station, the base station may evaluate the strength at which the base station receives the UE's transmissions and may transmit power control commands to the UE to cause the UE to adjust its transmission power. In an example implementation of such a process, if the base station determines that the receive signal strength from the UE is lower than a threshold level, the base station may transmit a power-up command to the UE, and the UE may responsively increment its transmission power. Whereas, if the base station determines that the receive signal strength is higher than the threshold level, the base station may transmit a power-down command to the UE, and the UE may responsively decrement its transmission power. Through this process, the base station and UE may thus work to reach a suitable UE transmission power, such as one at which the base station's receive signal strength is at or about the threshold level.

OVERVIEW

In general, when a UE starts to communicate with a base station, the UE and base station may need to engage in a power control process as described above to reach a suitable UE transmission power level. In typical practice, the delay in reaching that suitable transmission power level may not pose a problem. However, there may be some scenarios where it is important to more quickly reach a suitable UE transmission power level, particularly a UE transmission power level that is high enough for the base station to successfully receive and process UE transmissions.

By way of example, in a network arrangement where a UE is served by a base station in one RAN and the UE transitions from being served by that base station to being served instead by a base station in another RAN, it may be important for the UE to quickly reach a suitable transmission power level for communicating with the base station in the new RAN. In such an arrangement, if the UE does not reach a suitable transmission power level for communicating with the base station in the new RAN, the base station in the new RAN may not be able to properly serve the UE, and the UE's transition to being served by the base station in the new RAN may fail. Further, other situations may exist where it also important for a UE to quickly reach a suitable transmission power level for communication with a base station.

Disclosed herein is a method and corresponding system to help manage UE transmission power, specifically in a scenario where the UE was being served by a base station on a particular carrier frequency and the UE is then going to communicate with a base station (whether the same or another base station) instead on a different carrier frequency. At issue in that scenario is then what transmission power level the UE should use for its communication on the different carrier frequency.

This issue may arise in various situations. In the example noted above, for instance, the base station that was serving the UE in the first RAN may operate on a particular carrier frequency (e.g., a particular frequency band), and the base station that will serve the UE in the new RAN may operate on a different carrier frequency (e.g., a different frequency band). Thus, at issue in that situation would be what transmission power the UE should use for its transmission to the base station in the new RAN on the different carrier frequency. As another example, the UE may have been served by a particular base station on one carrier frequency and the UE may then begin to be served by that same base station on a different carrier frequency. And the issue in that situation would similarly be what transmission power the UE should use for its transmission to the base station on the different carrier frequency. Other examples are possible as well.

Thus, the disclosed method may apply in a scenario in which a UE, having been engaged in active communication with a first base station on an old carrier frequency, may seek to engage in communication with a second base station on a new carrier frequency. While the UE is in active mode, it may need to determine a suitable initial transmit power to use for an initial transmission to the second base station on the new carrier frequency. The initial transmission may be a transmission that originates communication of a given type (i.e., access or bearer) on the new carrier frequency, where the given type is the same as or different from the type of communication the UE was engaged in with the first base station on the old carrier frequency. Further, the first and second base stations may be the same base station. Alternatively, the first and second base stations may be different base stations at different locations, or may be different base stations that are co-located at a single site.

In accordance with the disclosure, the UE may determine a transmission power level to use for its communication on the new carrier frequency by considering the transmission power that it was using for transmission on the old carrier frequency and adjusting that transmission power based at least in part on a comparison between the old carrier frequency and the new carrier frequency. By way of example, if the new carrier frequency is higher than the old carrier frequency, then the UE may set itself to use a higher initial transmit power than it was using on the old carrier frequency, since the new, higher carrier frequency may not provide as great signal propagation and penetration. Whereas, if the new carrier frequency is lower than the old carrier frequency, then the UE may set itself to use a lower initial transmit power than it was using on the old carrier frequency, since the new, lower carrier frequency may provide better signal propagation and penetration.

Furthermore, the UE may also take into account its distance of communication on each carrier frequency as an additional basis to determine a transmission power level to use for communication on the new carrier frequency. For instance, if the UE was being served on the old carrier frequency by a first base station and the UE is going to be served on the new carrier frequency by a second, different base station, the UE could compare its distance from the first base station to its distance from the second base station, and use that comparison as a further basis to adjust from the transmission power that the UE was using for communication with the first base station. In particular, to the extent the UE is closer to the second base station than the first base station, the UE may reduce its transmission power in addition to any adjustment that the UE decides to make based on the comparison of carrier frequencies. Whereas, to the extent the UE is farther from the second base station than the first base station, the may increase its transmission power in addition to any adjustment that the UE decides to make based on the comparison of carrier frequencies. On the other hand, if the base stations are the same or are co-located, then the UE may make no distance-based adjustment.

Advantageously through this process, the UE may more quickly reach a suitable transmission power level for its communication on the new carrier frequency. In particular, the process may allow the UE to more quickly approach or reach a suitable transmission power level by helping to minimize the extent to which the UE needs to engage in power control signaling to reach that level.

Accordingly, in one respect, disclosed is a method that includes the UE determining, based on communication by the UE on a first carrier frequency, a baseline initial transmit power for the UE to use for an initial transmission from the UE to a cellular base station. The method also includes, responsive to the initial transmission being on a second carrier frequency different than the first carrier frequency, adjusting by the UE the baseline initial transmit power to establish an adjusted initial transmit power. The method then includes the UE engaging in the initial transmission using the adjusted baseline initial transmit power.

In another respect, disclosed is a UE that includes a wireless communication interface configured to engage in communication on a plurality of carrier frequencies including a first carrier frequency and a second carrier frequency. The UE also includes a control unit configured to determine, based on communication by the UE on the first carrier frequency and based on the second carrier frequency being different than the first carrier frequency, an initial transmit power for the UE to use for an initial transmission from the UE to a cellular base station on the second carrier frequency. The wireless communication interface may further be configured to then engage in communication with the cellular base station by providing the initial transmission at the determined initial transmit power.

In yet another respect, disclosed is a method that includes a UE determining, based on communication by the UE with a first base station on a first carrier frequency, a baseline initial transmit power for the UE to use for an initial transmission from the UE to a second base station. The method also includes, based on (i) the initial transmission being on a second carrier frequency different than the first carrier frequency and (ii) a comparison of a first geographic location of the first base station with a second geographic location of the second base station, the UE adjusting the baseline initial transmit power to establish an adjusted initial transmit power. The method then includes the UE engaging in the initial transmission to the second base station using the adjusted initial transmit power.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
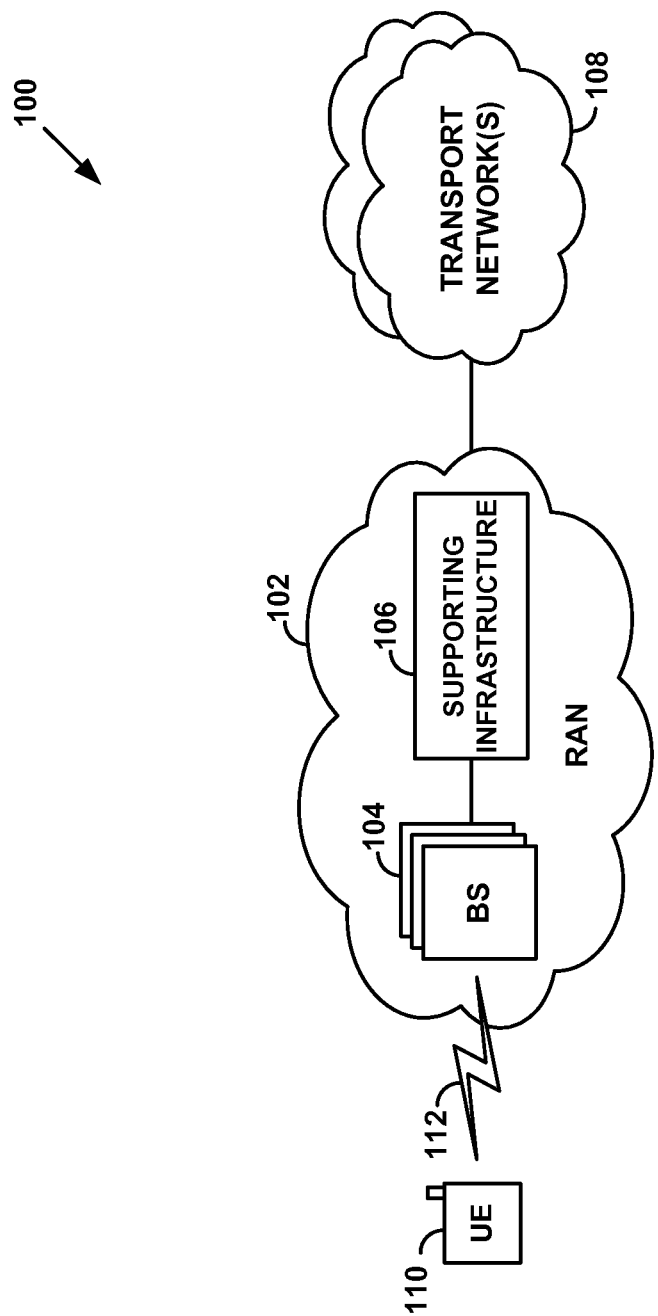
FIG. 1 depicts a simplified block diagram of an example communication system, in accordance with an example embodiment.

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

Referring to the drawings, as noted above, FIG. 1 is a simplified block diagram of an example communication system 100 in which the present method can be implemented. As shown, the example system 100 includes a radio access network (RAN) 102 having one or more base stations 104 (e.g., base transceiver stations (BTS), access nodes, node-Bs, eNo-deBs (eNB), or the like) that radiate to define a number of coverage areas, where each coverage area is operating on one or more carrier frequencies or blocks of frequencies. Further, the RAN 102 then includes supporting infrastructure 106, such as a base station controller, radio network controller, mobility management entity, mobile switching center, and/or gateway, which may function to control aspects of base station operation and/or to provide connectivity with one or more transport networks 108 such as the PSTN and/or the Internet.

FIG. 1 further illustrates a representative UE 110 that is located within coverage of the RAN 102 and being served by a given base station of the one or more base stations 104 over an air interface 112. The UE 110 may be any device that is equipped to engage in wireless communication with the RAN 102 and to carry out various UE functions described herein. By way of example, the UE may be a cell phone, or a wirelessly-equipped tablet, computer, tracking device, appliance, embedded wireless module, or other wirelessly-equipped device of a type now known or later developed, whether or not operated by a "user."

As noted above, after a UE has been engaged in active communication with a first base station on an old carrier frequency, the UE may seek to engage in communication with a second base station (the same or different base station) on a new carrier frequency. The UE may use the same air interface protocol or different air interface protocols for these respective communications on the old and new carrier frequencies. In practice, the UE may typically engage in the power control process described above in order to establish a suitable initial transmit power for communication with the second base station on the new carrier frequency. The present method can help the UE to reach that suitable initial transmit power more quickly.

In accordance with the present disclosure, the UE may consider various factors when determining a suitable initial transmit power to use for communication with the second base station on the new carrier frequency. For instance, the UE may determine the initial transmit power based at least in part on a difference between the new carrier frequency and the old carrier frequency on which the UE was served by the first base station. Additionally or alternatively, the UE may determine the initial transmit power based at least in part on a difference in a distance between the UE and the first base station and a distance between the UE and the second base station.

In line with the discussion above, the UE may first determine a baseline transmit power based on preceding communications (access or bearer) with the first base station that the UE had used to determine a suitable transmit power on the old carrier frequency. Namely, the UE may select the baseline initial transmit power to be the same transmit power that the UE was using for access or bearer transmissions to the first base station on the old carrier frequency or the same transmit power that the first base station used for access or bearer transmissions to the UE. For instance, the UE may determine the baseline transmit power based on an uplink and/or downlink signal strength of these transmissions on the old carrier frequency.

After the UE has determined the baseline initial transmit power, the UE may then (1) adjust from that baseline transmit power based on one or more of the factors noted above and (2) use the adjusted transmit power for an initial transmission to the second base station on the new carrier frequency for access or bearer communications.

Figure 2A:
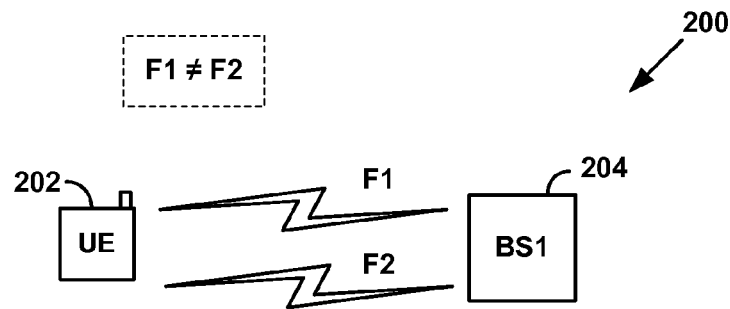
FIGS. 2A-2C are block diagrams of example scenarios in which the present method can be implemented.
Figure 2B:
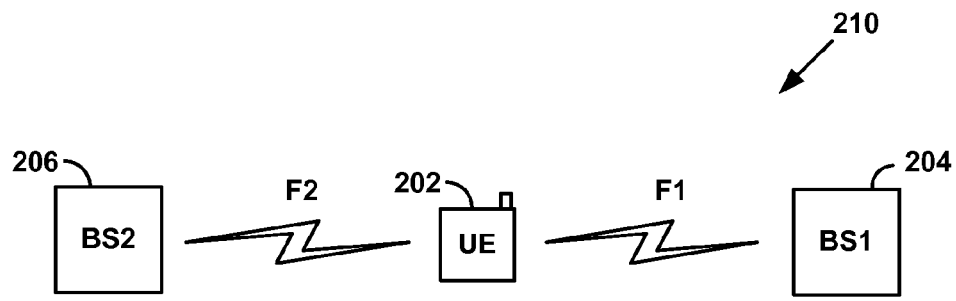
Figure 2C:
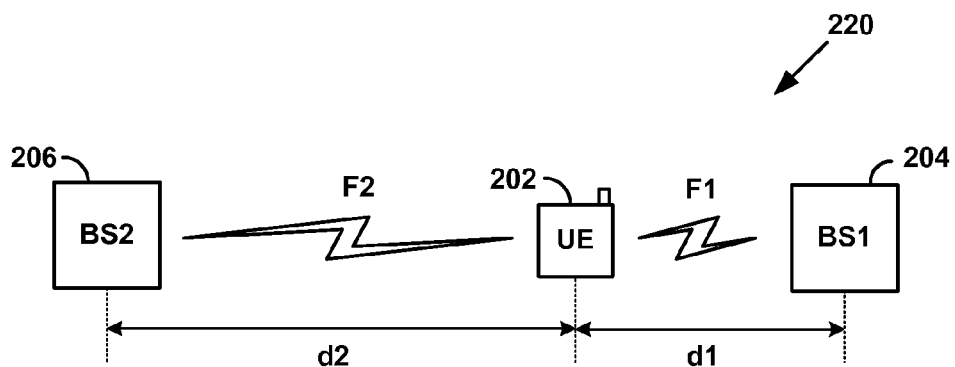

Next, FIGS. 2A-2C illustrate example scenarios in which the disclosed method may be performed. In the scenario 200 shown in FIG. 2A, for instance, after the UE 202 has been served by a first base station 204 on an old carrier frequency (F1), the UE 202 may seek to be served by a second base station on a different carrier frequency (F2) that is the same as the first base station 204 or that is different from, but co-located with the first base station 204. In such a scenario, the UE 202 may determine a baseline initial transmit power, as described above. The UE 202 may then adjust that baseline power based on a difference between F1 and F2.

For example, if F1 is lower than F2, the UE 202 may increase the baseline transmit power. In this case, the UE 202 may need a higher transmit power for an initial transmission on F2 than the transmit power that the UE used for F1 since higher frequencies like F2 have a shorter propagation distance and less penetration than lower frequencies like F1. Thus, the UE 202 may increase the baseline transmit power when F1 is lower than F2 in order to increase the chance that the second base station 204 successfully receives the initial transmission. The UE 202 may then use the increased baseline transmit power as an initial transmit power for the initial transmission to the second base station 204 on F2.

Conversely, if F1 is higher than F2, the UE 202 may decrease the baseline transmit power. In line with the discussion above, the UE 202 may be able to use a lower transmit power on F2 than it used on F1 because lower frequencies like F2 have a longer propagation distance and greater penetration than higher frequencies like F1. Thus, the UE 202 can decrease the baseline transmit power when F1 is higher than F2, and the second base station 204 may still receive the initial transmission successfully. The UE 202 may then use the decreased baseline transmit power as an initial transmit power for the initial transmission to the second base station 204 on F2.

FIG. 2B illustrates a scenario 210 where the first base station 204 and the second base station 206 are different base stations at different locations. In this scenario 210, the UE 202 may switch from being served by the first base station 204 on F1 to being served by the second base station 206 on F2. As discussed above, the UE 202 may determine a baseline transmit power and then adjust that baseline transmit power based at least in part on a difference between F1 and F2. In addition, when the first base station 204 and the second base station 206 are at different locations, the UE 202 may further adjust the baseline transmit power based on a difference in the distances between the UE 202 and each respective base station. To facilitate this in practice, the base stations may broadcast an indication of their geographic locations so that the UE 202 can detect where each base station is, and the UE 202 may also determine its own geographic location. As such, the UE 202 may compare its distance from the first base station 204 to its distance from the second base station 206, and use that comparison to further adjust the baseline transmit power. In the scenario 200 shown in FIG. 2A, however, where the two base stations are either the same base station or are co-located, such a comparison may result in a difference of zero. Thus, the UE 202 would make little or no distance-based adjustment to the baseline transmit power in that scenario 200.

FIG. 2C illustrates a more detailed example 220 of the scenario in FIG. 2B. Here, the first base station 204 may be located at a first distance (d1) from the UE 202, and the second base station 206 may be located at a different, second distance (d2) from the UE 202. In this scenario 220, the UE 202 may adjust the baseline transmit power based on the difference between F1 and F2 as described above. The UE 202 may then compare d1 and d2, and that comparison may give rise to an additional, distance-based adjustment by the UE 202 to the frequency-based adjusted baseline transmit power.

For instance, if the first base station 204 is closer to the UE 202 than the second base station 206 (i.e., d1<d2) as shown, the UE 202 may increase the frequency-based adjusted baseline transmit power. In this case, the initial transmission will have to travel a larger distance to the second base station 206 than the UE's 202 communications had to travel to the first base station 204. Thus, the UE 202 increasing the frequency-based adjusted baseline transmit power may further increase the chance that the second base station 206 successfully receives the initial transmission. As a more specific example, the UE 202 may determine an adjustment to the baseline transmit power based on a comparison of F1 and F2. Then, if the UE 202 determines that the second base station 206 is twice as far from the UE 202 as the first base station 204, for instance, the UE 202 may double the frequency-based adjusted baseline transmit power to compensate for the larger distance, and then use the resulting transmit power as an initial transmit power for the initial transmission to the second base station 206 on F2.

Conversely, if the first base station 204 is farther from the UE 202 than the second base station 206 (i.e., d1>d2), the UE 202 may decrease the frequency-based adjusted baseline transmit power because the initial transmission does not have to travel as far to the second base station 206 as UE's 202 communications had to travel to the first base station 204. The UE 202 can thus use less power for the initial transmission. For example, the UE 202 may first determine an adjustment to the baseline transmit power based on a comparison of F1 and F2. Then, if the UE 202 determines that the first base station 204 is twice as far from the UE 202 as the second base station 206, the UE 202 may divide the frequency-based adjusted baseline transmit power by two, and then use the resulting transmit power as an initial transmit power for the initial transmission to the second base station 206 on F2.

Other example scenarios are possible as well, including, but not limited to, variations of the example scenarios described above.

Figure 3:
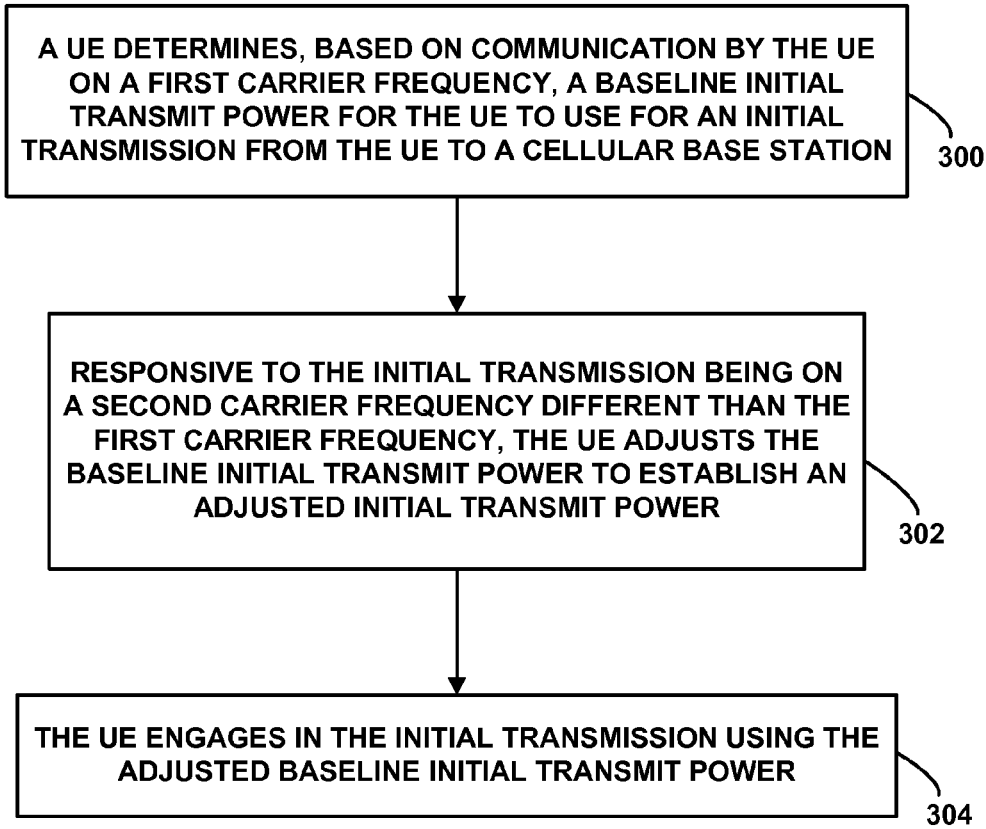
FIG. 3 is a flow chart depicting functions that can be carried out in accordance with the present method.

FIG. 3 is a flow chart depicting functions that can be carried out in accordance with the present method. For sake of example, the present method will be assumed to be carried out by a UE with respect to the network arrangements and scenarios illustrated in FIGS. 1 and 2. It should be understood, however, that in other examples, the present method may also be carried out with respect to other arrangements and scenarios. The present method may include one or more operations, functions, or actions as illustrated by one or more of blocks 300-304.

At block 300, the method involves a UE determining, based on communication by the UE on a first carrier frequency, a baseline initial transmit power for the UE to use for an initial transmission from the UE to a cellular base station. Next, at block 302, the method involves, responsive to the initial transmission being on a second carrier frequency different than the first carrier frequency, the UE adjusting the baseline initial transmit power to establish an adjusted initial transmit power. At block 304, the method then involves the UE engaging in the initial transmission using the adjusted baseline initial transmit power.

As discussed above, the UE may determine the baseline initial transmit power based on a transmit power that the UE used for a preceding uplink communication on the first carrier frequency or based on a transmit power of a preceding downlink communication that the UE received on the first carrier frequency. After the UE has determined the baseline initial transmit power, the UE may then adjust from that baseline initial transmit power based on a difference between the first and second carrier frequencies. By way of example, if the second carrier frequency is higher than the first carrier frequency, the UE may responsively increase the baseline initial transmit power. Whereas, if the second carrier frequency is lower than the first carrier frequency, the UE may responsively decrease the baseline initial transmit power.

Furthermore, it is possible that the UE's communication on the first carrier frequency may have been with a first base station, and that the UE's initial transmission on the second carrier frequency may be an initial transmission to a second base station that is either the same base station as the first base station or a different base station that is co-located with the first base station. In some scenarios, however, the first and second base stations may not be the same or co-located. Rather, the first base station may be located at a first geographic location and the second base station may be located at a second geographic location different than the first geographic location. In such a scenario, the UE may determine that the first and second base stations are not co-located and then adjust the baseline initial transmit power responsive to that determination.

In particular, the UE may determine that a first distance between a geographic location of the UE and the first geographic location of the first base station is less than a second distance between the geographic location of the UE and the second geographic location of the second base station, and may adjust the baseline initial transmit power responsive to that determination. Alternatively, the UE may determine that the first distance is greater than the second distance, and may adjust the baseline initial transmit power responsive to that determination.

As noted above, these distance-based adjustments to the baseline initial transmit power may be made as an additional adjustment to the baseline initial transmit power after the UE has already adjusted the baseline initial transmit power based on the difference between the first and second carrier frequencies. The UE may then engage in the initial transmission using the resulting transmit power.

Figure 4:
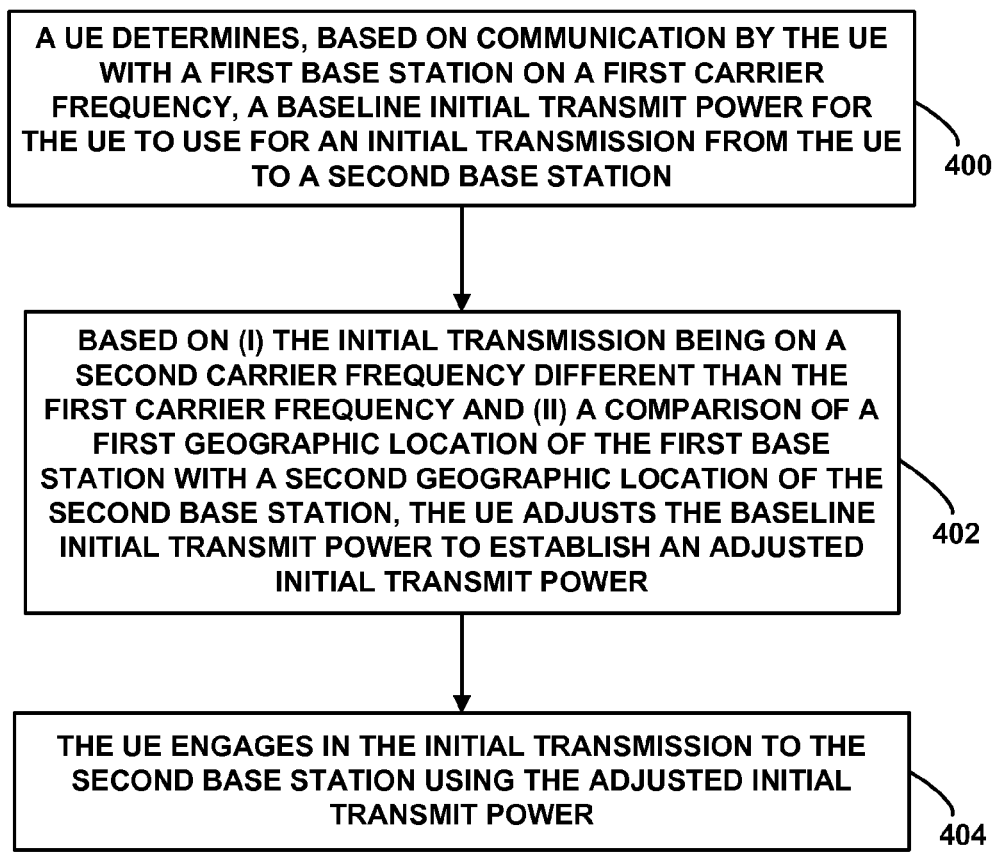
FIG. 4 is another flow chart depicting functions that can be carried out in accordance with the present method.

FIG. 4 is next another, more specific flow chart depicting functions that can be carried out in accordance with the present method. At block 400, the method involves the UE determining, based on communication by the UE with a first base station on a first carrier frequency, a baseline initial transmit power for the UE to use for an initial transmission from the UE to a second base station. Next, at block 402, the method involves, based on (i) the initial transmission being on a second carrier frequency different than the first carrier frequency and (ii) a comparison of a first geographic location of the first base station with a second geographic location of the second base station, adjusting by the UE the baseline initial transmit power to establish an adjusted initial transmit power. At block 404, the method then involves the UE engaging in the initial transmission to the second base station using the adjusted initial transmit power.

As described above, the UE may determine whether the first carrier frequency is lower (or higher) than the second carrier frequency, and then increase (or decrease) the baseline initial transmit power based on that determination. In turn, the UE may make further adjustments to the frequency-based adjusted baseline initial transmit power based on the comparison of the first geographic location of the first base station with the second geographic location of the second base station. In particular, the UE may compare the geographic locations of the first and second base stations with the UE's own geographic location. For instance, the UE's geographic location may be at a first distance from the first geographic location of the first base station and at a second distance from the second geographic location of the second base station. If the comparison of the geographic locations of the base stations indicates that the first distance is less than the second distance, the UE may responsively increase the baseline initial transmit power in order to determine the adjusted baseline initial transmit power. Whereas, if the comparison indicates that the first distance is greater than the second distance, the UE may responsively decrease the baseline initial transmit power in order to determine the adjusted baseline initial transmit power. In either scenario, the UE may increase or decrease the baseline initial transmit power by multiplying the baseline initial transmit power by a ratio of the second distance to the first distance.

Figure 5:
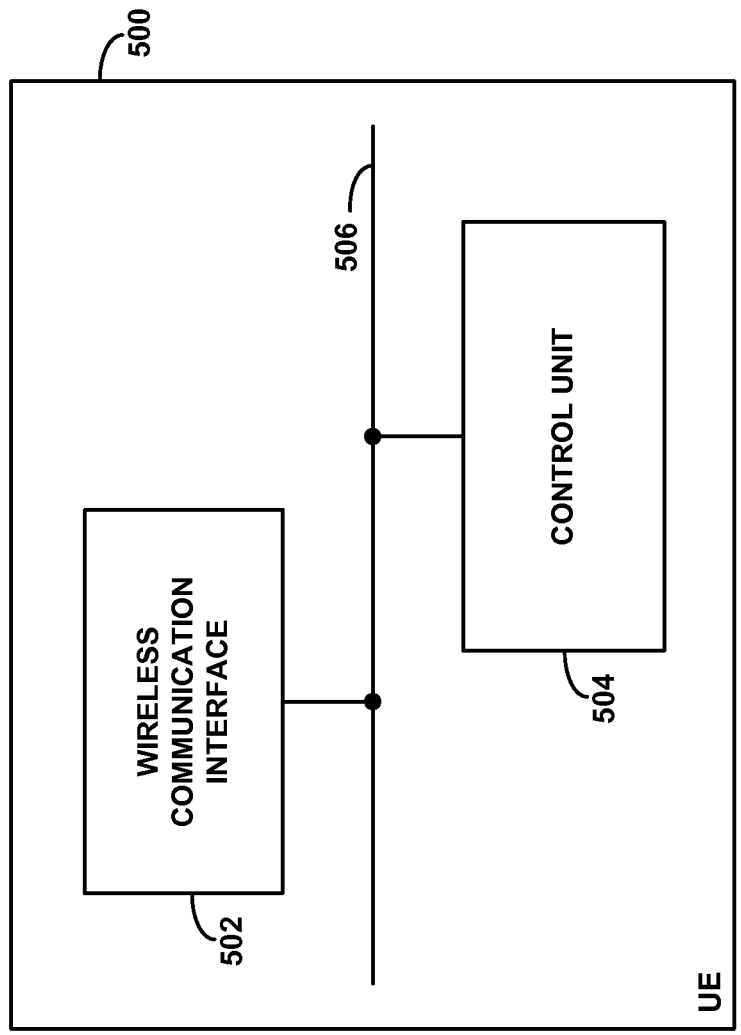
FIG. 5 is a simplified block diagram of a representative UE arranged to implement aspects of the present method.

FIG. 5 is next a simplified block diagram of a UE 500 arranged to implement the present method. As shown in FIG. 5, the UE includes a wireless communication interface 502 and a control unit 504, both of which may be communicatively linked together by a system bus network, or other connection mechanism 506.

The wireless communication interface 502 may include an antenna structure and associated components (e.g., a mobile station modem chipset) for engaging in wireless communication with a RAN that radiates to define a plurality of wireless coverage areas each operating on one or more carrier frequencies. As such, the wireless communication interface 502 may support communication on various carrier frequencies and may comprise an integrated circuit that is arranged with logic compliant with an applicable air interface protocol such as one of those noted above for instance. The UE 500 may also include a multi-mode radio arranged to support service according to various air interface protocols. Accordingly, the UE's communication on the first carrier frequency and the UE's communication on the second carrier frequency may use the same air interface protocol or different air interface protocols, as noted above.

The control unit 504 may then be configured to carry out various functions described herein, such as to determine, based on communication by the UE on a first carrier frequency and based on a second carrier frequency being different than the first carrier frequency, an initial transmit power for the UE to use for an initial transmission from the UE to a cellular base station on the second carrier frequency. And the wireless communication interface 500 may be configured to provide the initial transmission to the cellular base station, under direction of the control unit for instance.

As such, the control unit 504 may be integrated with the wireless communication interface 502. For instance, program logic on a wireless communication interface chipset may be arranged to carry out the functions of the control unit. In that or other arrangements, the control unit may comprise a processing unit programmed with instructions to carry out the monitoring and the defining. For instance, the control unit may comprise one or more general-purpose processors (e.g., microprocessors) and/or one or more special-purpose processors (e.g., application specific integrated circuits), non-transitory data storage, and program instructions stored in or encoded on the data storage and executable by the processor(s) to carry out various described functions.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining by a UE a transmit power used by the UE for a transmission from the UE to a first base station on a first carrier frequency;
   using by the UE the determined transmit power as a baseline initial transmit power for the UE to use for an initial transmission from the UE to a second, different base station;
   making by the UE a comparison of a first geographic location of the first base station with a second geographic location of the second base station;
   responsive to the initial transmission being on a second carrier frequency different than the first carrier frequency, and based on the comparison of the first geographic location of the first base station with the second geographic location of the second base station, adjusting by the UE the baseline initial transmit power to establish an adjusted initial transmit power; and
   engaging by the UE in the initial transmission to the second base station using the adjusted baseline initial transmit power.

2. The method of claim 1, wherein the second carrier frequency is lower than the first carrier frequency, and wherein adjusting the baseline transmit power responsive to the initial transmission being on the second carrier frequency different than the first carrier frequency comprises decreasing the baseline initial transmit power in response to the second carrier frequency being lower than the first carrier frequency.

3. The method of claim 1, wherein the second carrier frequency is higher than the first carrier frequency, and wherein adjusting the baseline transmit power responsive to the initial transmission being on the second carrier frequency different than the first carrier frequency comprises increasing the baseline initial transmit power in response to the second carrier frequency being higher than the first carrier frequency.

4. The method of claim 1, further comprising:
based on the comparison of the first geographic location of the first base station with the second geographic location of the second base station, determining by the UE that the first base station is not co-located with the second base station,
wherein adjusting the baseline initial transmit power based on the comparison of the first geographic location of the first base station with the second geographic location of the second base station comprises adjusting the baseline initial transmit power further responsive to the determining by the UE that the first base station is not co-located with the second base station.

5. The method of claim 4, further comprising:
based on the comparison of the first geographic location of the first base station with the second geographic location of the second base station, determining by the UE that a first distance between a geographic location of the UE and the first geographic location of the first base station is less than a second distance between the geographic location of the UE and the second geographic location of the second base station,
wherein adjusting the baseline initial transmit power based on the comparison of the first geographic location of the first base station with the second geographic location of the second base station comprises adjusting the baseline initial transmit power further responsive to the determining by the UE that the first distance between the geographic location of the UE and the first geographic location of the first base station is less than the second distance between the geographic location of the UE and the second geographic location of the second base station.

6. The method of claim 4, further comprising:
based on the comparison of the first geographic location of the first base station with the second geographic location of the second base station, determining by the UE that a first distance between a geographic location of the UE and the first geographic location of the first base station is greater than a second distance between the geographic location of the UE and the second geographic location of the second base station,
wherein adjusting the baseline initial transmit power based on the comparison of the first geographic location of the first base station with the second geographic location of the second base station comprises adjusting the baseline initial transmit power further responsive to the determining by the UE that the first distance between the geographic location of the UE and the first geographic location of the first base station is greater than the second distance between the geographic location of the UE and the second geographic location of the second base station.

7. A user equipment device (UE) comprising:
a wireless communication interface configured to engage in communication on a plurality of carrier frequencies including a first carrier frequency and a second carrier frequency; and
a control unit configured to (i) determine a transmit power used by the UE for a transmission from the UE to a first base station on the first carrier frequency, (ii) use the determined transmit power as a baseline initial transmit power for the UE to use for an initial transmission from the UE to a second, different base station, (iii) make a comparison of a first geographic location of the first base station with a second geographic location of the second base station, and (iv) based on the second carrier frequency being different than the first carrier frequency, and further based on the comparison of the first geographic location of the first base station with the second geographic location of the second base station, adjust the baseline initial transmit power to establish an adjusted initial transmit power,
wherein the wireless communication interface is configured to engage in communication with the second base station by providing the initial transmission to the second base station at the adjusted initial transmit power.

8. The UE of claim 7, wherein the control unit is integrated with the wireless communication interface.

9. The UE of claim 7, wherein the control unit comprises a processing unit programmed with instructions to determine the initial transmit power, use the determined transmit power as the baseline initial transmit power, make the comparison of the first geographic location of the first base station with the second geographic location of the second base station, and adjust the baseline initial transmit power to establish the adjusted initial transmit power.

10. The UE of claim 7, wherein adjusting the baseline initial transmit power to establish the adjusted initial transmit power based on the second carrier frequency being different than the first carrier frequency comprises:
increasing the baseline initial transmit power based on the second carrier frequency being higher than the first carrier frequency, and
determining the adjusted initial transmit power to be the increased baseline initial transmit power.

11. A method comprising:
determining by a user equipment device (UE) a transmit power used by the UE for a transmission from the UE to a first base station on a first carrier frequency;
using by the UE the determined transmit power as a baseline initial transmit power for the UE to use for an initial transmission from the UE to a second, different base station;
making by the UE a comparison of a first geographic location of the first base station with a second geographic location of the second base station;
based on (i) the initial transmission being on a second carrier frequency different than the first carrier frequency and (ii) the comparison of the first geographic location of the first base station with the second geographic location of the second base station, adjusting by the UE the baseline initial transmit power to establish an adjusted initial transmit power; and
engaging by the UE in the initial transmission to the second base station using the adjusted initial transmit power.

12. The method of claim 11, wherein adjusting the baseline transmit power based on the comparison of the first geographic location of the first base station with the second geographic location of the second base station comprises decreasing the baseline initial transmit power based on the comparison indicating that a first distance between a geographic location of the UE and the first geographic location of the first base station is greater than a second distance between the geographic location of the UE and the second geographic location of the second base station.

13. The method of claim 11, wherein adjusting the baseline transmit power based on the comparison of the first geographic location of the first base station with the second geographic location of the second base station comprises increasing the baseline initial transmit power based on the comparison indicating that a first distance between a geographic location of the UE and the first geographic location of the first base station is less than a second distance between the geographic location of the UE and the second geographic location of the second base station.

14. The method of claim 11, wherein adjusting the baseline initial transmit power comprises determining the adjusted initial transmit power to be the baseline initial transmit power multiplied by a ratio of a distance between a geographic location of the UE and the second geographic location of the second base station to a distance between the geographic location of the UE and the first geographic location of the first base station.

15. The method of claim 11, wherein the second carrier frequency is lower than the first carrier frequency, and wherein adjusting the baseline transmit power based on the initial transmission being on the second carrier frequency different than the first carrier frequency comprises decreasing the baseline initial transmit power based on the second carrier frequency being lower than the first carrier frequency.

16. The method of claim 11, wherein the second carrier frequency is higher than the first carrier frequency, and wherein adjusting the baseline transmit power based on the initial transmission being on the second carrier frequency different than the first carrier frequency comprises increasing the baseline initial transmit power based on the second carrier frequency being higher than the first carrier frequency.

* * * * *